US011677466B1

(12) United States Patent
Searcy et al.

(10) Patent No.: US 11,677,466 B1
(45) Date of Patent: Jun. 13, 2023

(54) RADIO FREQUENCY—FREE SPACE OPTICAL HYBRID TRANSCEIVERS

(71) Applicant: BridgeComm, Inc., Denver, CO (US)

(72) Inventors: Paul Searcy, Niwot, CO (US); Barry Matsumori, Rolling Hills Estates, CA (US)

(73) Assignee: BridgeComm, Inc., Denver, CO (US)

( * ) Notice: Subject to any disclaimer, the term of this patent is extended or adjusted under 35 U.S.C. 154(b) by 0 days.

(21) Appl. No.: 17/379,853

(22) Filed: Jul. 19, 2021

Related U.S. Application Data

(60) Provisional application No. 63/053,590, filed on Jul. 18, 2020.

(51) Int. Cl.
*H04B 10/00* (2013.01)
*H04B 10/112* (2013.01)
*H04B 1/38* (2015.01)
*H04B 10/07* (2013.01)
*H04B 10/61* (2013.01)

(52) U.S. Cl.
CPC ........... *H04B 10/1123* (2013.01); *H04B 1/38* (2013.01); *H04B 10/07* (2013.01); *H04B 10/614* (2013.01)

(58) Field of Classification Search
CPC .. H04B 10/1123; H04B 10/07; H04B 10/614; H04B 1/38
USPC .......................................................... 398/115
See application file for complete search history.

(56) References Cited

U.S. PATENT DOCUMENTS

| 10,419,106 B1* | 9/2019 | Liu | H04L 67/2842 |
|---|---|---|---|
| 2012/0002973 A1* | 1/2012 | Bruzzi | H01Q 13/0208 |
| | | | 343/781 R |
| 2012/0128295 A1* | 5/2012 | Lim | G02B 6/4246 |
| | | | 385/24 |
| 2017/0104543 A1* | 4/2017 | Taylor | H04B 10/40 |

FOREIGN PATENT DOCUMENTS

| WO | WO 2013036321 A1 * | 3/2013 | H01H 47/22 |
|---|---|---|---|
| WO | WO 2017/136682 A1 * | 8/2017 | H04W 36/30 |
| WO | WO-2021062162 A1 * | 4/2021 | G02B 5/20 |

\* cited by examiner

*Primary Examiner* — Mohammad R Sedighian
(74) *Attorney, Agent, or Firm* — Neugeboren O'Dowd PC

(57) ABSTRACT

A radio frequency (RF)/free space optical (FSO) hybrid transceiver includes at least one FSO sub-transceiver configured for emitting and receiving optical communication signals, and at least one RF sub-transceiver configured for emitting and receiving RF communication signals. The RF sub-transceiver and the FSO sub-transceiver cooperate to simultaneously emit and receive optical and RF communication signals at the RF/FSO hybrid transceiver. The RF/FSO hybrid transceiver may further include a processor for controlling the RF and FSO sub-transceivers, and for processing both the RF and optical communication signals. The RF/FSO hybrid transceiver may also include a splitter/combiner, delay systems, and mirrors configured to cooperate with the processor to produce a plurality of rays.

19 Claims, 12 Drawing Sheets

RADIO FREQUENCY—FREE SPACE OPTICAL HYBRID TRANSCEIVERS

FIELD OF THE INVENTION

The present invention relates to laser communications and, more particularly, to laser communication transceivers capable of handling both radio frequency (RF) and optical signals.

BACKGROUND OF THE INVENTION

Current communication systems rely on the use of radio frequencies (RF) for the data downlink from low Earth orbit (LEO) small satellite (SmallSat) or from Geosynchronous satellites (GEO). For example, communication channels between different geostationary earth orbit (GEO) satellites, between a GEO satellite and lower earth orbit (LEO) satellites, between a GEO satellite and a ground station, mobile user on an aircraft or submarine, or an unmanned autonomous vehicle (UAV) are currently possible using RF SmallSats. However, there are limitations to the data rates and data capacity of RF SmallSats used alone due to the frequency range and mechanical limitations of the current systems.

For example, the transceivers and ground stations of current systems require gimbals and other large mechanical means for physically scanning the field of view of the devices through a range of angles in order to be able to capture signal over those angles. This requirement is due to the fact that the currently available transceivers include a single aperture radio telescope or other antenna implementations for capturing and transmitting data signals therebetween. Such mechanical implementations are impractical or even detrimental for physical space and weight constrained applications such as on airplanes and UAVs.

New technologies, such as a Managed Optical Communication Array (MOCA) transceiver with multiple sub-transceivers (disclosed in U.S. Provisional App. No. 62/985,437 filed on 5 Mar. 2020), provide additional flexibility to free space optical (FSO) communication systems. An example of a transceiver with multiple MOCA sub-transceivers is shown in FIG. 1. The MOCA sub-transceivers can be fixedly located on a surface that may be planar or curved. As shown in FIG. 1, optical transceiver 100 is designed with a low profile to allow three sub-transceivers 110, 112, and 114 (i.e., TX1, TX2, and TX3, respectively) to be mounted pointing at different angles ($\theta_1$, $\theta_2$, and $\theta_3$, respectively) as indicated by arrows 120, 122, and 124, respectively. This configuration allows the overall transceiver to send and receive signals over a larger field of view without a need to mechanically move the transceiver. For example, a desired field of view is covered by $\theta_1$ to $\theta_3$, represented by the overlapping angle ranges $\beta_1$, $\beta_2$, and $\beta_3$, such that the transceiver does not need to be mechanically translated in order to enable optical communication over the desired field of view. As another example, only a portion of the desired field of view is covered by $\theta_1$ to $\theta_N$, and a mirror, gimbal, piezoelectric motor, or other mechanical or optical arrangement can be used to cover the remainder of the desired field of view by providing a motion that is equal to or greater than $\theta_1$ to $\theta_3$. That is, if sub-transceiver 110 is oriented at $\theta_1$, and a single transceiver can access a full range of $\beta_1$, then transceiver can access $\theta_1 \pm \frac{1}{2}\beta_1$. As the range $\beta$ for the MOCA sub-transceiver can be on the order of 90-degrees or more, the MOCA sub-transceivers can steer light signals far beyond a field of view that is accessible using RF signals.

In other words, by using multiple sub-transceivers, with the possibility of overlapping (partially or completely) outputs, and parallel optical paths, additional functionality can be integrated into the overall network operations. In another example, each one of sub-transceivers 110, 112, and 114 is configured to send and/or receive signals with different beam parameters. For instance, each one of sub-transceivers 110, 112, and 114 can be configured to transmit an optical signal at a different frequency and/or polarization from each other sub-transceiver.

An example of an implementation of multiple MOCA transceivers, each including an array of sub-transceivers, is shown in FIG. 2. FIG. 2 shows a transceiver system 200 controlled by a processor 205. Processor 205 also controls a node (or splitter) 210 as well as delay systems 212A-212E. After being processed through each of delay systems 212A-212E, in the example illustrated in FIG. 2, the optical signal emerging from each transceiver system is transmitted through a fiber link 220, a beam splitter 222, a position sensitive detector (PSD) 224, reflected from a fast-steering mirror (FSM) 226 and turning mirror 228, and a curved mirror 230 to produce a plurality of rays 240. Each of fiber links 220A through 220E, beam splitters 222A through 222E, PSDs 224A through 224E, FSMs 226A through 226E, turning mirrors 228A through 228E, and curved mirror 230 can be identical to each other or set up with different configurations from each other. Plurality of rays 240A-240E emerging from each of transceiver systems establish separate communication channels 250A-250E, respectively, with a faraway target (shown in FIG. 6 as a satellite 260).

By controlling the variety of components shown in FIG. 2, processor 205 controls each the phase, angle, wavelength, time delay, and amplitude of the plurality of rays 240A-240E. That is, each sub-transceiver within transceiver system 200 is instructed by processor 205 to transmit, or not transmit, an optical beam having a specifically defined wavelength, pulse delay, polarization, timing offset and phase during a given transmit period. This selective approach to improving the specific parameters of the optical signal beam allow high data connections by increasing the data rate and reducing the bit error rate (BER) in a highly granular, dynamic loop.

While FSO communications systems, such as those using MOCA sub-transceivers, provide additional functionalities to FSO communication systems, improvements are always needed to further promote wide spread deployment of FSO communication systems.

SUMMARY OF THE INVENTION

In accordance with the embodiments described herein, a radio frequency/free space optical (RF/FSO) hybrid transceiver, combining high-speed communication capabilities of a Managed Optical Communication Array (MOCA) transceiver with robust and long-range communication characteristics of RF components, is disclosed.

In another embodiment, a method for using a RF/FSO hybrid transceiver, combining high-speed communication capabilities of a Managed Optical Communication Array (MOCA) transceiver with robust and long-range communication characteristics of RF components, is disclosed.

DETAILED DESCRIPTION OF EMBODIMENTS OF THE INVENTION

Figure 1:
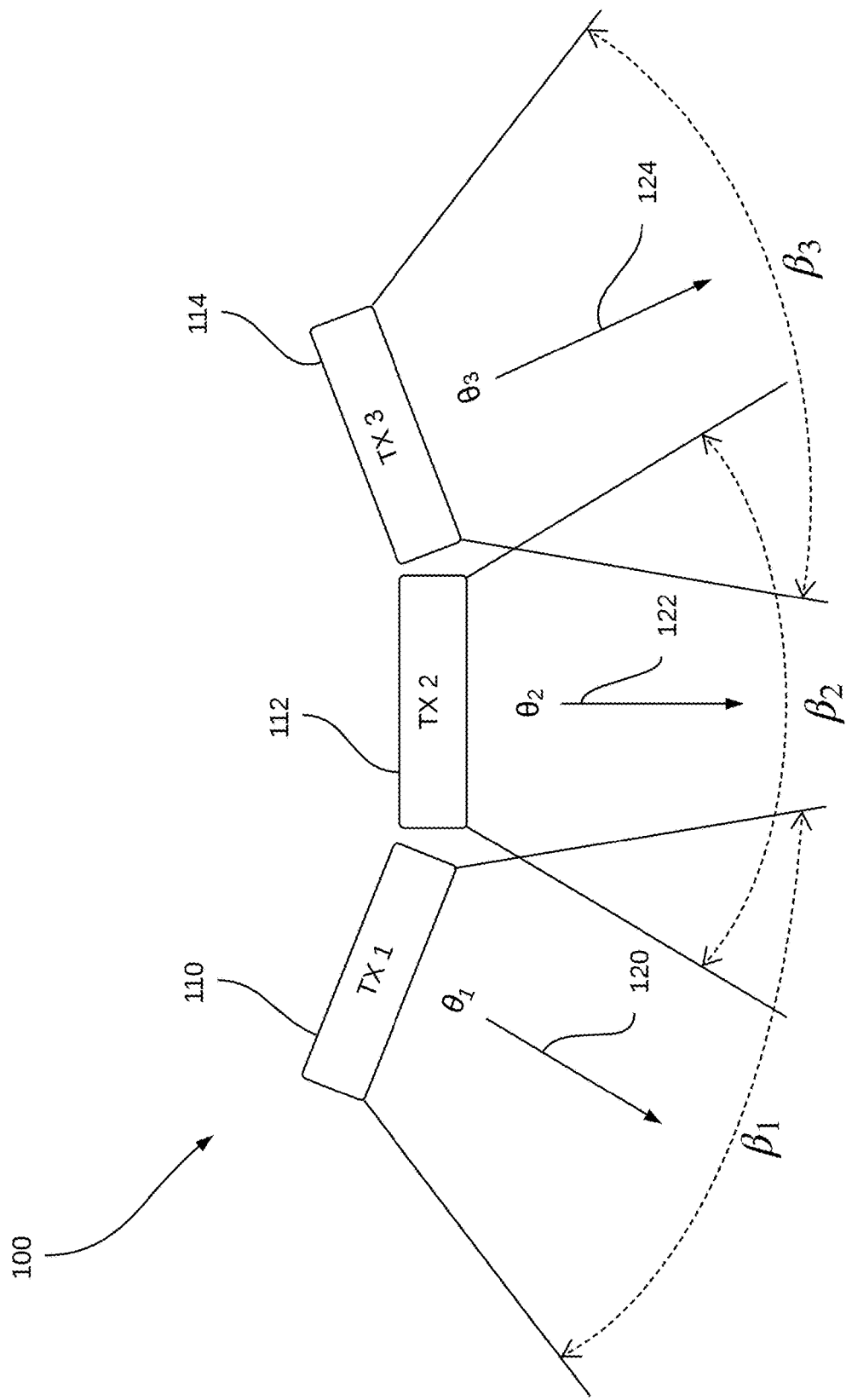
FIG. 1 illustrates an exemplary transceiver arrangement.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Optical communication systems are poised to take a breakthrough role and significantly enhance existing RF systems by adding massive data channel rates, lower power systems with less chance of interception and interruption. As an example, technology developments are enabling the migration from traditional RF designs to optical communications to provide a significant leap in the data downlink capabilities of LEO SmallSats.

A factor in the transition from RF systems to optical systems is the availability of a full turnkey solution that seamlessly connects users including space and aeronautical assets to each other as well as ground stations. While such an optical connectivity system will increase the speed, security, and efficiency of data transmissions from LEO SmallSats with additional capabilities beyond those provided by RF systems, RF communications still provide certain advantages. For example, for spaced-based communication systems, a broader scan for incoming signal or for a target for outbound signals possible with RF signals can allow faster acquisition of the signal compared to the pinpoint accuracy required with optical communications. It would be desirable to have a communication system that combines the advantages of RF systems with the data transmission speed and security enabled by FSO systems. That is, complementary aspects of RF and FSO communication systems can be combined in a RF/FSO hybrid system to provide advantages beyond separate RF and FSO systems. A hybrid RF and FSO communication system, by combining the high-speed communication capabilities of a Managed Optical Communication Array (MOCA) transceiver with the robust and long-range communication characteristics of RF components, provides advantages beyond those provided by RF-only or FSO-only communication systems. Such RF/FSO hybrid systems are applicable to a variety of environments, whether space, airborne, terrestrial, or marine, enabling benefits of optical communications with the combined availability of RF and optical systems.

Figure 3:
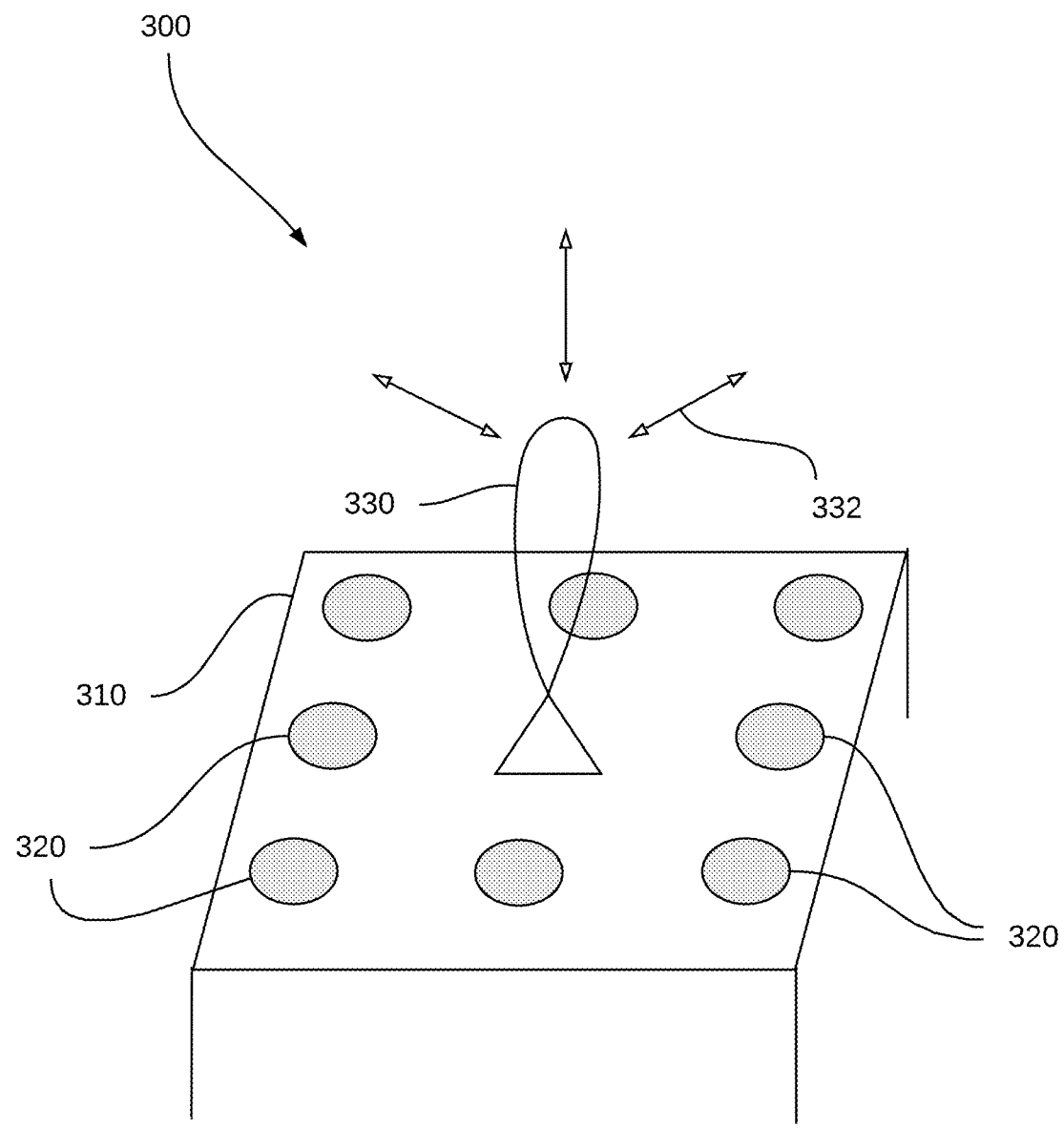
FIG. 3 shows an exemplary radio frequency/free space optical (RF/FSO) hybrid transceiver, in accordance with an embodiment.

FIG. 3 shows an example of a RF/FSO hybrid transceiver, in accordance with an embodiment. A RF/FSO hybrid system 300 includes a substrate 310 supporting a plurality of MOCA sub-transceivers 320 thereon. Each MOCA sub-transceiver 320 may be, for example, one of transceivers 110, 112, and 114 of FIG. 1, and may be configured for emitting and receiving optical communication signals (e.g., in the infrared wavelengths) over a range of angles, wavelengths, and polarization states. Additionally, a RF antenna 330 is also supported on substrate 310 to emit and receive RF signals therewith. RF antenna 330 may be, for example, an omnidirectional antenna capable of emitting and receiving RF signals over a substantially semispherical range of angles. While FIG. 3 is shown with a single RF antenna 330, two or more RF antennas may be provided to provide redundancy and/or additional functionality. For example, as each RF antenna is limited in its spectrum range, incorporating multiple RF antennas, each covering a different spectrum range from each other, can help increase the spectrum coverage. Additionally, multiple antennas with different characteristics, such as omni-directional, shaped coverage, or other, can be provided, thus providing different functionalities than can be provided by a single antenna. For instance, a plurality of highly directional RF antenna configuration can extend the transceiver system's spatial and spectral coverage.

While substrate 310 is shown as a standalone item in FIG. 3, MOCA sub-transceiver 320 and RF antenna 330 may alternatively be supported on a surface of a larger object, such as an outer surface of a vehicle or aircraft, or integrated into a larger system, such as a satellite.

The combination of RF and optical functionalities enables many advantages. For instance, complementary functions, such as faster target acquisition enabled by the RF antenna, along with the potential use of the RF signals as a back channel or telemetry data link, can be combined with the high-speed data transfer enabled by the optical links of the MOCA sub-transceivers. For instance, the back channel enables transmission of RF data beyond telemetry information, such as and not limited to additional data, complementary data to that transmitted by the MOCA sub-transceivers, or encryption information. As an example, the RF antenna can be used for coarse tracking of a target object using wide swaths of RF signals, then the fine tuning of the signal direction can be performed to establish the optical link, thus improving the efficiency of initial target acquisition. Integration of the RF/FSO transceiver hardware may also create savings in size, weight, and/or power. Moreover, co-location and shared geometry of the RF/FSO transceiver may simplify the firmware and analytical algorithms necessary to operate the transceiver system by enabling the use of the RF antenna as a communications telemetry channel. Such a telemetry channel can also be used to provide Quality of Service (QoS) information, separately from and ahead of the communication data transmission, enabling the transmitted data signal to be pre-compensated for factors such as atmospheric disturbances due to weather conditions. Such pre-compensation can be performed, for example, using adaptive optics or a spatial mode control device integrated into the MOCA array. In an example, an RF (or optical) telemetry link can be used to pass back the received energy distribution, as collected over the array of MOCA sub-transceivers, to effectively mimic an adaptive optical system without a need for a traditional Shack-Hartmann wavefront sensor and deformable mirror arrangement at the receiving end of the communication link.

Further, due to the flexibility in transmission direction and data signal parameters (e.g., polarization, phase, timing, and wavelength), multiple, simultaneous optical links can be established. For instance, each MOCA sub-transceiver can be pointed in a different direction from incoming/outgoing RF signals such that the array of MOCA sub-transceivers can scan around the direction of RF antenna 330 and/or establish additional, off-axis connections to create mesh network connections, enabling flexible direct connections between RF/FSO hybrid system 300 and multiple nodes located remotely from RF/FSO hybrid system 300. Such a mesh network can support a multitude of network nodes such that data traffic can be managed through those nodes to support additional functionalities related to latency, security, node capacity loading, and other network management functions. Any requirements on the pointing direction of the RF antenna can be relaxed as the optical signals from the MOCA sub-transceivers can be steered outside of the RF field of regard, thus reducing or eliminating requirements for RF phased arrays or the use of a reaction wheel.

Figure 2:
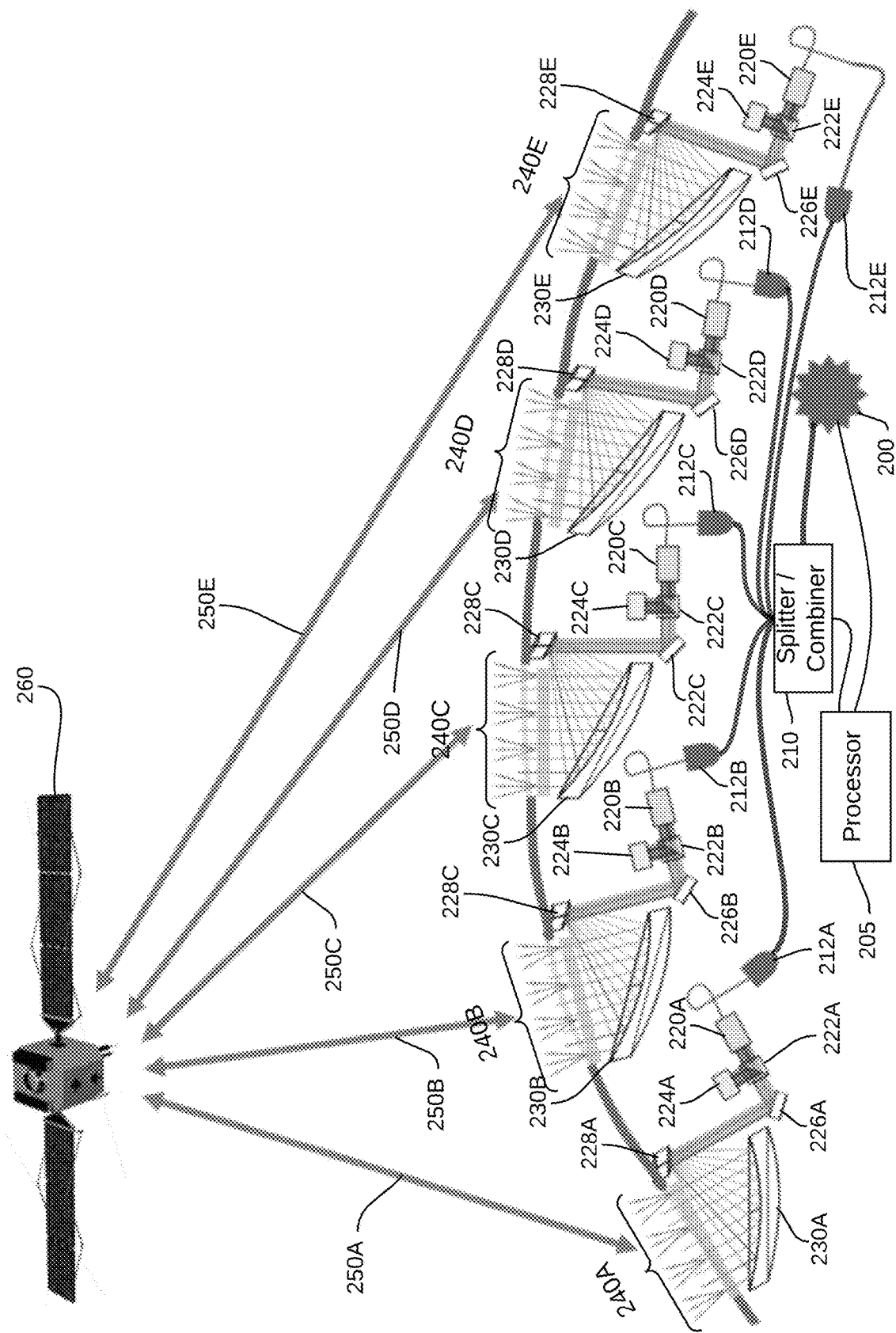
FIG. 2 shows an exemplary transceiver arrangement.
Figure 4:
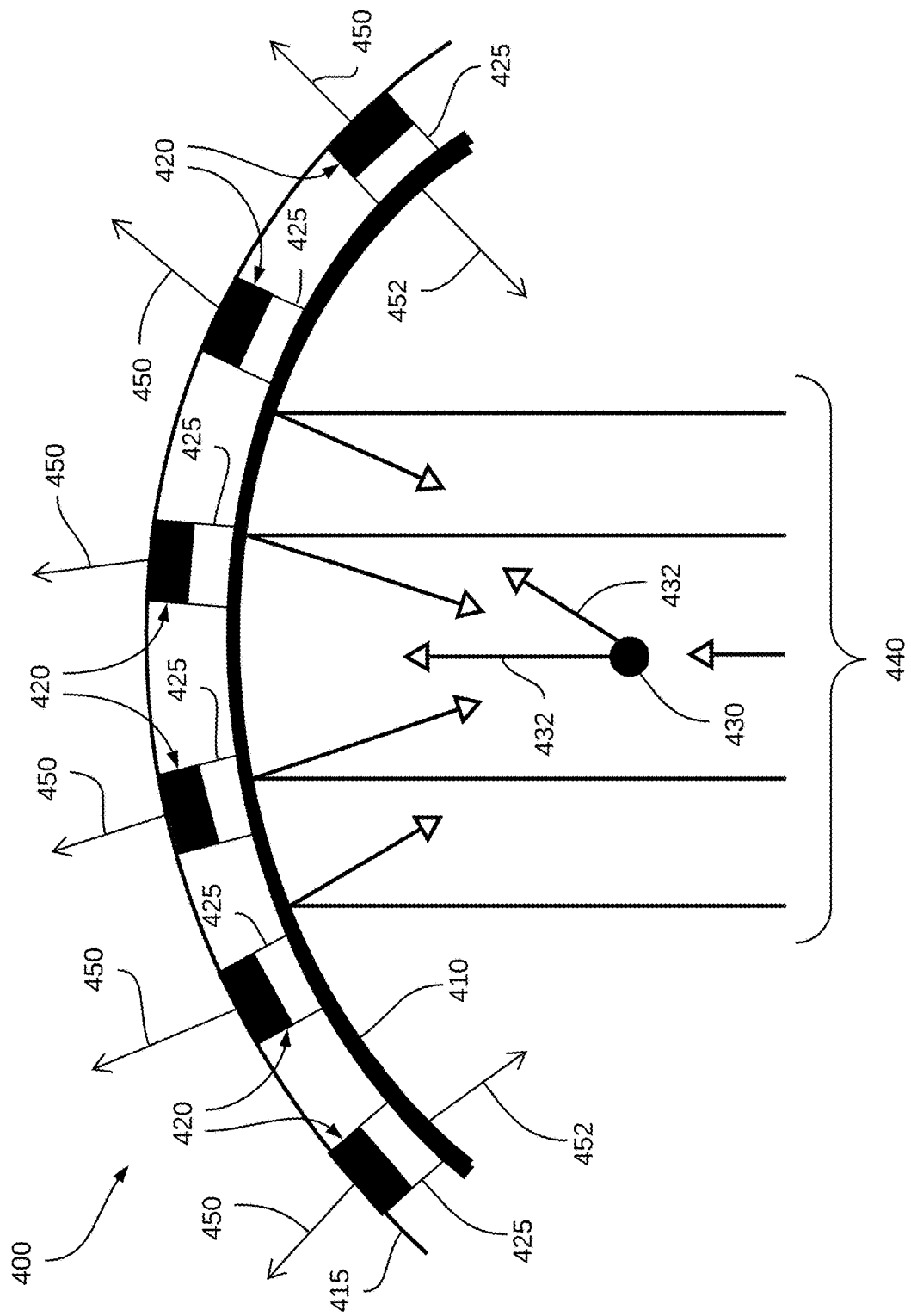
FIG. 4 shows another exemplary RF/FSO hybrid transceiver, in accordance with an embodiment.

FIG. 4 shows another example of a RF/FSO hybrid transceiver, in accordance with an embodiment. In a RF/FSO hybrid transceiver 400, a radio reflector 410 and an enclosure 415 supports an array of MOCA sub-transceivers 420 therein. Each MOCA sub-transceiver 420 includes control circuitry 425 for controlling the optical emission from the MOCA sub-transceiver (e.g., timing, phase, direction, wavelength, polarization, etc.). Control circuitry 425 may be connected for, for example, a combiner/splitter and/or processor, such as shown in FIG. 2. Radio reflector 410 is part of a phased array RF emitter including a RF transceiver 430 emitting outgoing RF signals 432 (indicated by arrows). Radio reflector 410 is configured for reflecting incoming RF signals 440 (also indicated by arrows) toward RF transceiver 430 for detection. That is, in this embodiment, the MOCA sub-transceivers are integrated into the mechanical features of RF antenna 430.

Continuing to refer to FIG. 4, in an example, a surface of each MOCA sub-transceiver is formed of a material that is reflective to RF yet transmits in the desired communication wavelengths (e.g., indium-tin-oxide, which efficiently transmits around the 1550 nm wavelength) such that RF/FSO hybrid transceiver 400 operates as an effective RF transceiver while still efficiently transmitting at optical wavelengths. In this way, RF/FSO hybrid transceiver 400 allows establishment of independent links for data transfer, target acquisition and tracking, and/or telemetry, then optimize the links for ease of use and operational efficiency. MOCA sub-transceivers 420 may emit optical signals outward away from RF transceiver 430 (as indicated by an arrow 450). Optionally, radio reflector 410 is formed of an RF reflective, IR transmissive material such that MOCA sub-transceivers 420 may also emit optical signals through radio reflector 410 (as indicated by arrows 452). Further, simultaneous data transmission on both RF and optical wavelengths is enabled by RF/FSO hybrid transceiver 400.

There have been some examples of large form factor parabolic RF receivers, such as large ground antennas for satellite coverage, incorporating optical telescopes to assist in the pointing of the RF receiver at a specific target or to aid in astronomy applications. However, the RF/FSO hybrid transceivers described herein provide additional functionalities for enhanced communication protocol by taking advantage of the complementary data communications capabilities of the devices in both radio frequency and optical frequency data transmission. For instance, the small form factor of the MOCA technology enables both large and small reflectors, whether parabolic, flat panel, single radiating element, multiple radiating elements, or phase arrays, to integrate optical communications with traditional RF communication modes. In addition, since MOCA transceivers can steer the optical angles using non-mechanical means, the particular angles indicated by 450 and 452 are not fixed and can be used for dynamically creating links in the optical network.

Figure 5:
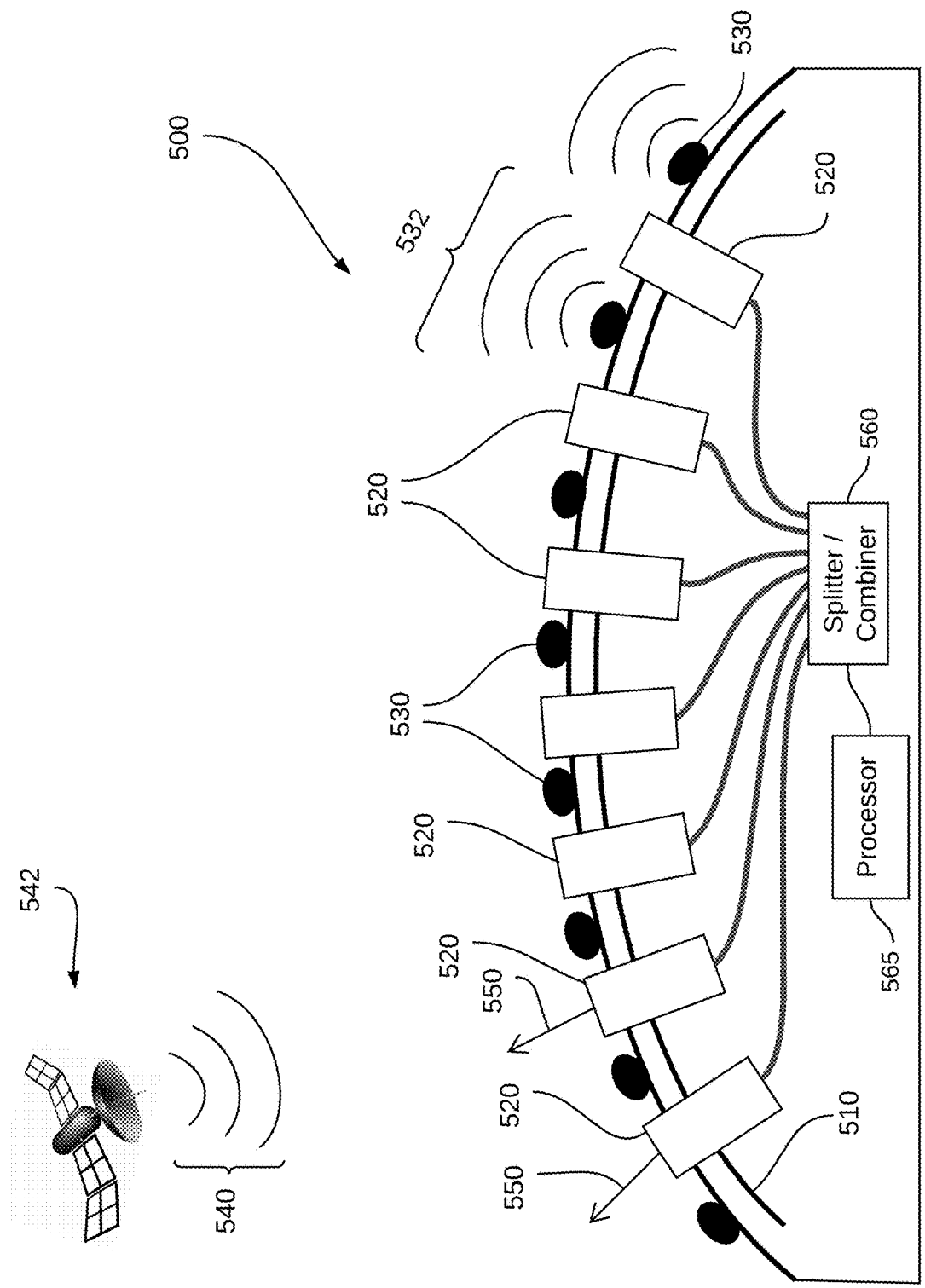
FIG. 5 shows still another RF/FSO hybrid transceiver, in accordance with an embodiment.

Turning now to FIG. 5, another example of a RF/FSO hybrid transceiver, in accordance with an embodiment, is illustrated. A RF/FSO hybrid transceiver 500 includes a convex surface 510 supporting a combination of an array of MOCA sub-transceivers 520 and an array of RF antennae 530 thereon. In an example, each one of RF antennae 530, or the array of RF antennae 530 collectively, is configured for emitting RF signals 532 outward from convex surface 510 such that RF signals 532 create a far field pattern useful for RF communications with an RF transceiver located remotely from RF/FSO hybrid transceiver 500. Additionally, each one of RF antennae 530, or the array of RF antennae 530 collectively, is configured for receiving RF signals (as indicated by arrows 540) from a satellite 542, as an example. It is noted that, while RF/FSO hybrid transceiver 500 is shown in space communications with satellite 542, RF/FSO hybrid transceiver 500 can also communicate with an RF and/or optical communications enabled device located in terrestrial, airborne, or marine situations.

Each one of MOCA sub-transceivers 520 emits an optical signal 550, wherein optical signal 550 from each MOCA sub-transceiver 520 may be modulated in optical signal parameters, such as direction, wavelength, polarization, timing, and phase.

Figure 6:
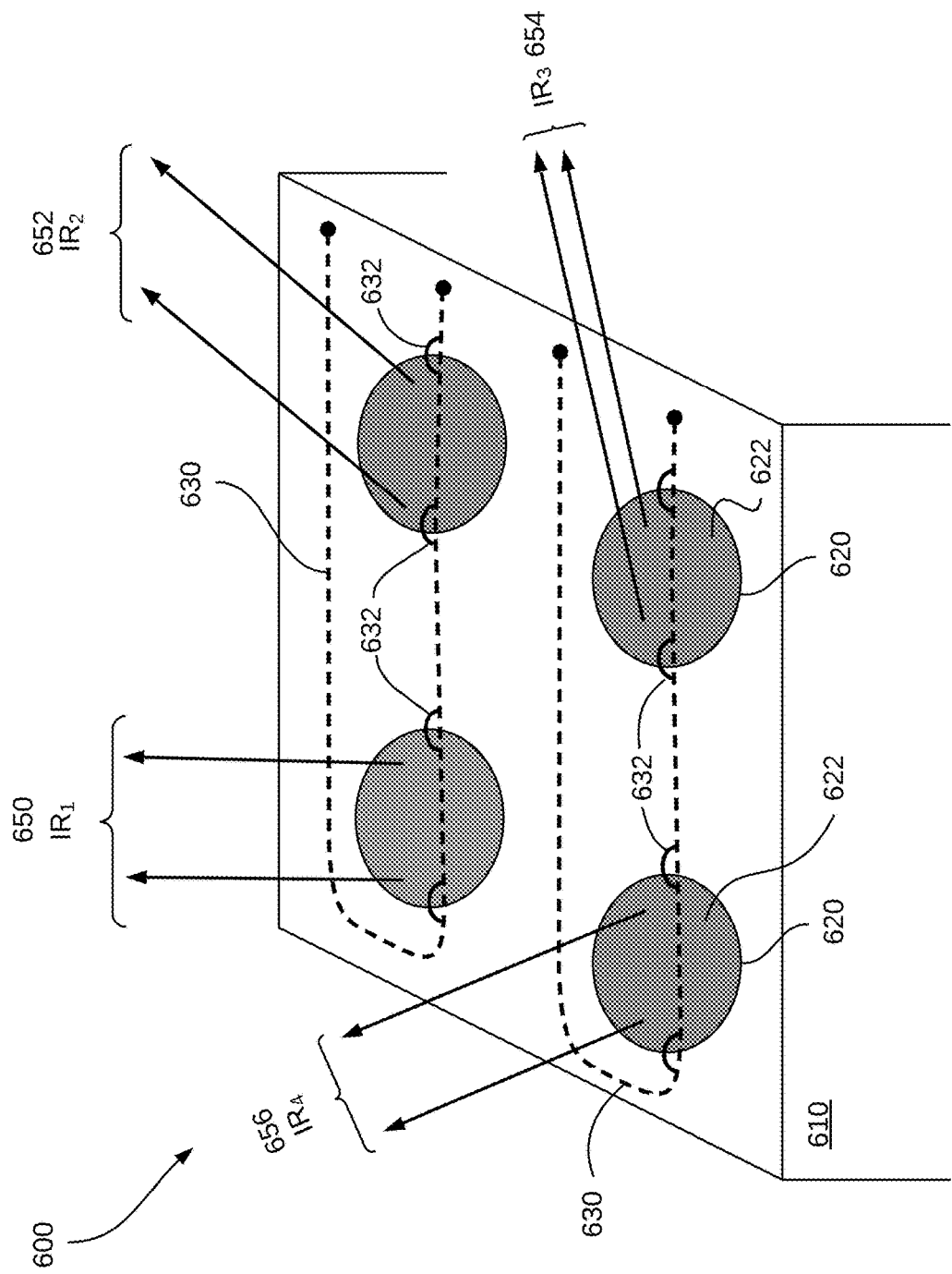
FIG. 6 shows yet another RF/FSO hybrid transceiver, in accordance with an embodiment.

FIG. 6 shows a further example of a RF/FSO hybrid transceiver, in accordance with an embodiment. As shown in FIG. 6, a RF/FSO hybrid transceiver 600 includes a surface 610 supporting a plurality of MOCA sub-transceivers 620 thereon. Each one of the plurality of MOCA sub-transceivers 620 includes an outer window 622, which is reflective to RF radiation while being transmissive to light of communications wavelengths (e.g., 1550 nm). Further, surface 610 supports an array of RF antennae 630. In the example illustrated in FIG. 6, each RF antenna 630 is routed partially over one or more MOCA sub-transceivers 620. Optionally, RF antenna 630 may be electrically connected with one or more MOCA sub-transceivers 620 via interconnects 632. Surface 610 may be formed of a material that is reflective to RF wavelengths. Also, each MOCA sub-transceiver 620 transmits an IR signal characterized by a particular set of optical parameters, including direction, wavelength, polarization, phase, and timing (as indicated by arrows 650, 652, 654, and 656). That is, each MOCA sub-transceiver can be operated independently from each other and from the RF signal transmission and receiving capabilities of RF/FSO hybrid transceiver 600.

Figure 7:
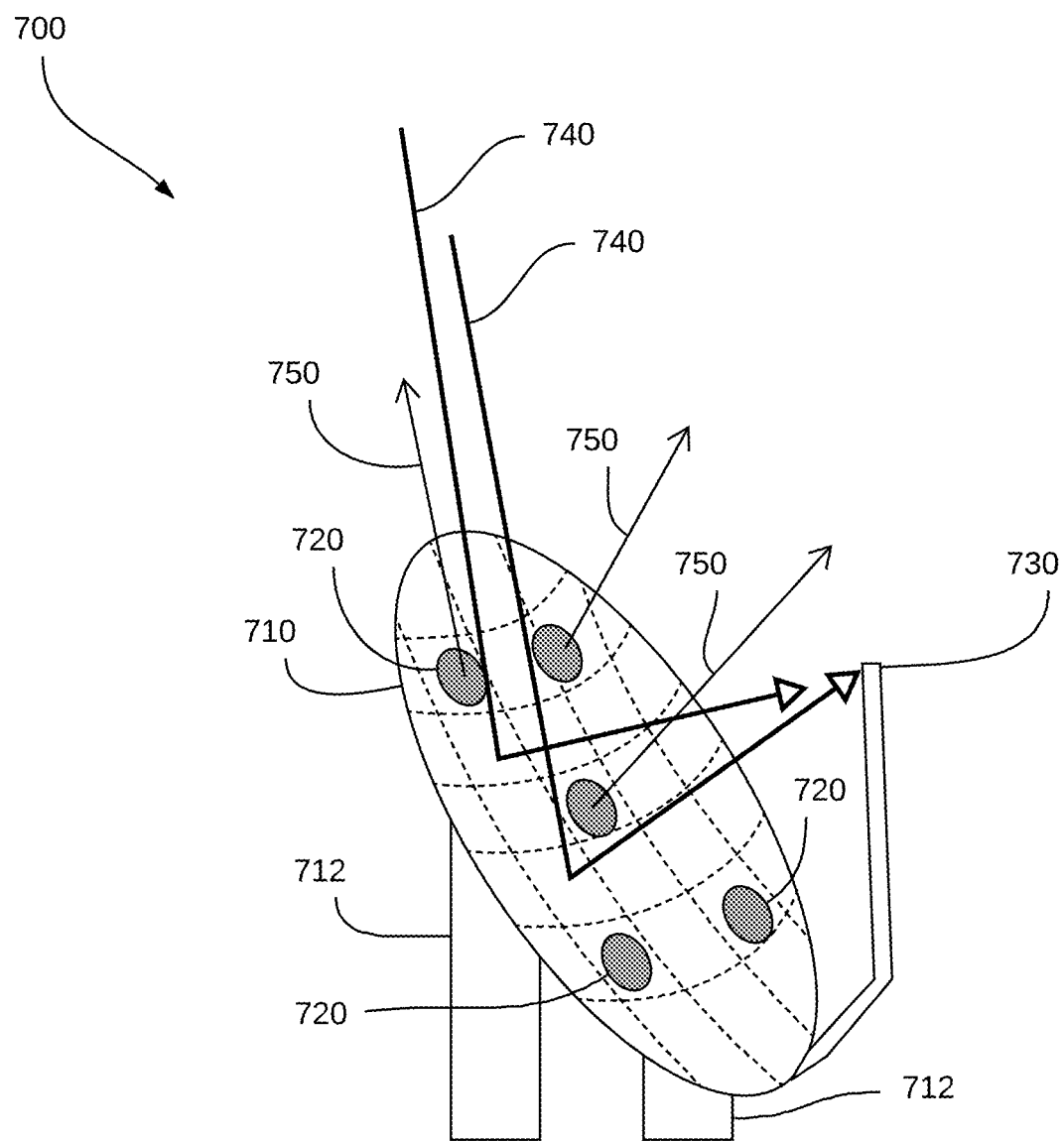
FIG. 7 shows a perspective view of still another RF/FSO hybrid transceiver, in accordance with an embodiment.

FIG. 7 shows a perspective view of still another RF/FSO hybrid transceiver, in accordance with an embodiment. RF/FSO hybrid transceiver system 700 includes a parabolic antenna 710, supported in supports 712 and integrating a plurality of MOCA sub-transceivers 720. Parabolic antenna 710 is also configured for collecting at an RF receiver 730 input RF signals (represented by thick arrows 740). In an example, each MOCA sub-transceiver 720 is independently controllable so as to emit optical signals (represented by arrows 750) in an independently controllable direction such that the plurality of MOCA sub-transceivers 720 are capable of directing optical signals 750 in different directions from each other.

Figure 8:
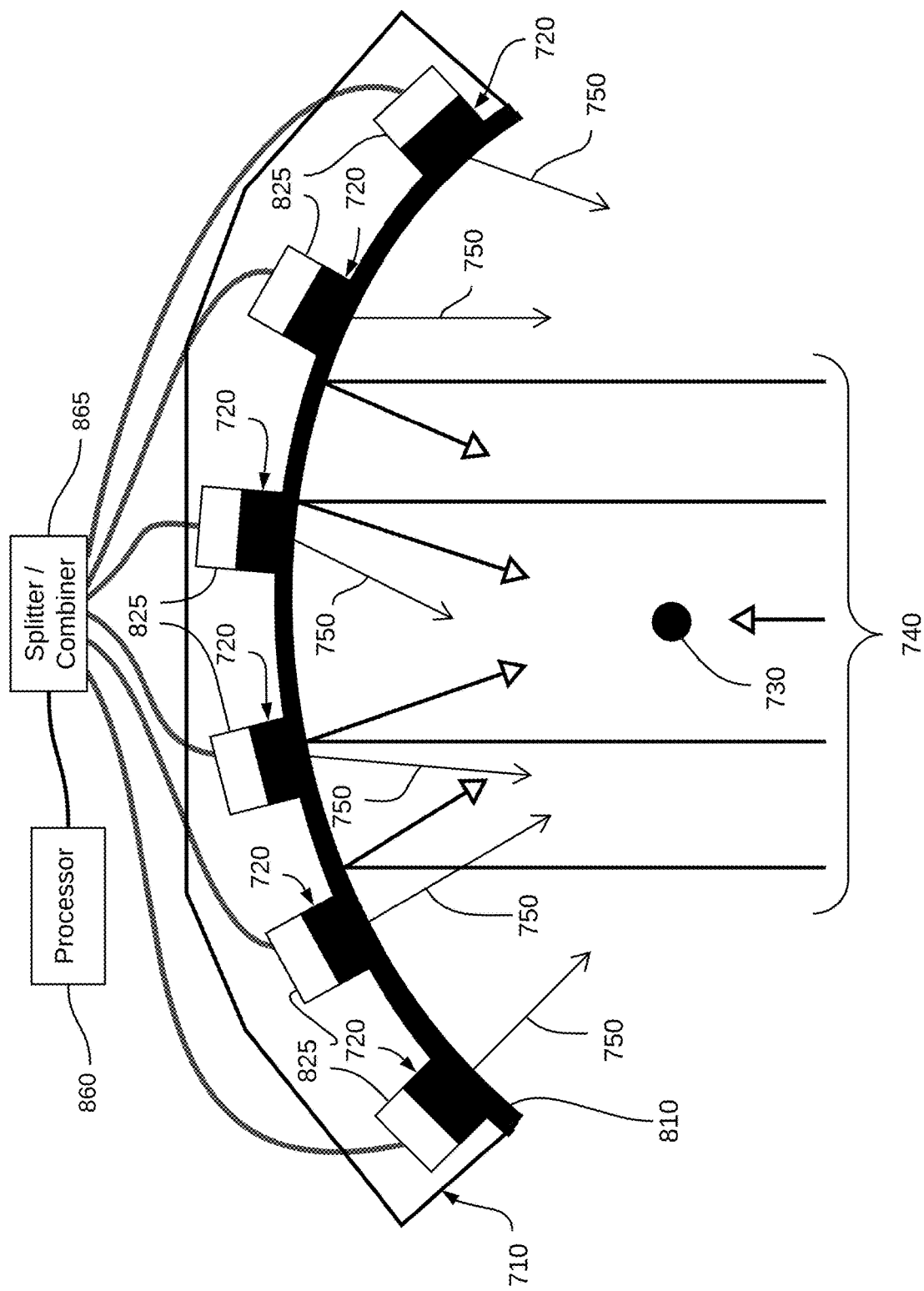
FIG. 8 shows a cross-sectional of the RF/FSO hybrid transceiver of FIG. 7, in accordance with an embodiment.

FIG. 8 shows a cross-sectional of RF/FSO hybrid transceiver 700 of FIG. 7, in accordance with an embodiment. As shown in FIG. 8, a front surface 810 of parabolic antenna 710 is formed of a material transmissive to optical signal wavelengths while reflecting signals in the radio frequencies, in accordance with an embodiment. Furthermore, each MOCA sub-transceiver 720 includes a control circuitry 825 for enabling individual control of each MOCA sub-transceiver 720 by, for example, a processor 860 for coordinating the operation of all MOCA sub-transceivers 720 in RF/FSO hybrid transceiver 700 via a splitter/combiner 865, which is configured for transmitting the control signals from processor 860 to each MOCA sub-transceiver 720 as well as receiving signal data from each MOCA sub-transceiver 720 and transmitting the received data to processor 860. Processor 860 can transmit to each MOCA sub-transceiver control signals related to, for example, data transmission (e.g., timing, wavelength, polarization, phase, and amplitude) and target (e.g., coordinates, direction, type of target, etc.). In this way, RF/FSO hybrid transceiver 700 enables the seamless integration of RF and FSO communications capabilities into a single system.

Figure 9:
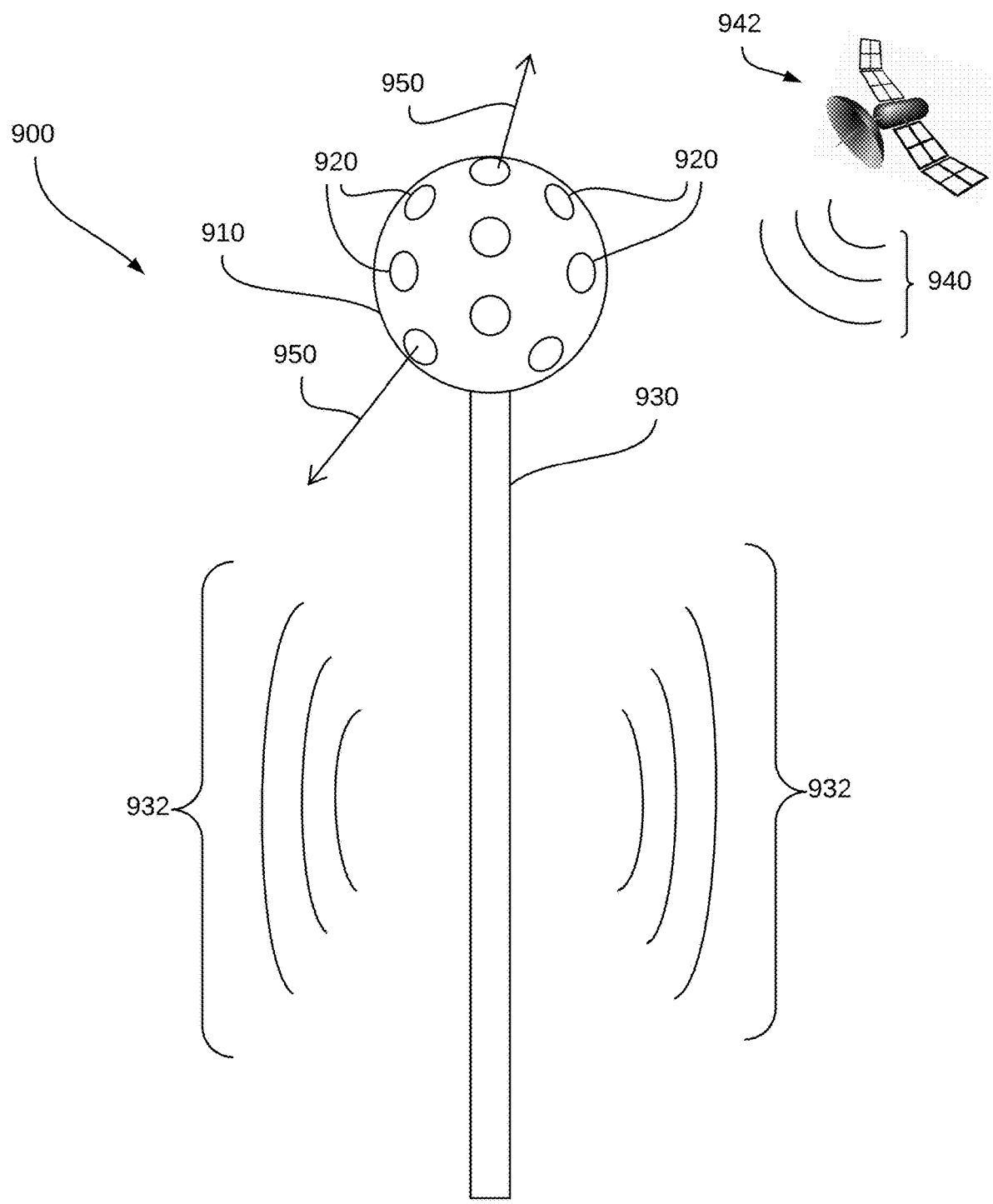
FIG. 9 shows a further example of a RF/FSO hybrid transceiver, in accordance with an embodiment.

FIG. 9 shows a further example of a RF/FSO hybrid transceiver, in accordance with an embodiment. RF/FSO hybrid transceiver 900 includes a spherical portion 910 supporting a plurality of MOCA sub-transceivers 920 thereon, pointing in a range of directions. Spherical portion 910 is supported on a vertical support 930, which includes an RF antenna structure therein (not visible). In an example, spherical portion 910 is fixedly supported on vertical support 930. Alternatively, spherical portion 910 can be rotatably supported on vertical support 930, thus enabling rotation of spherical portion 910, and consequently of MOCA sub-transceivers 920. The RF antenna structure contained within vertical support 930 is configured for generating RF signals (represented by arcs 932). In an example, the RF antenna structure is also configured for receiving incoming RF signals (represented by arcs 940) from a remote source, such as a satellite 942 as shown or another airborne or terrestrial source of RF signal. Each one of MOCA sub-transceivers 920 is configured for transmitting optical signals (represented by arrows 950) in individually controllable directions. The RF antenna structure contained within vertical support 930 can be formed, for example, as a dipole antenna or another suitable RF communication configuration as known to those skilled in the art of RF communications.

Figure 10:
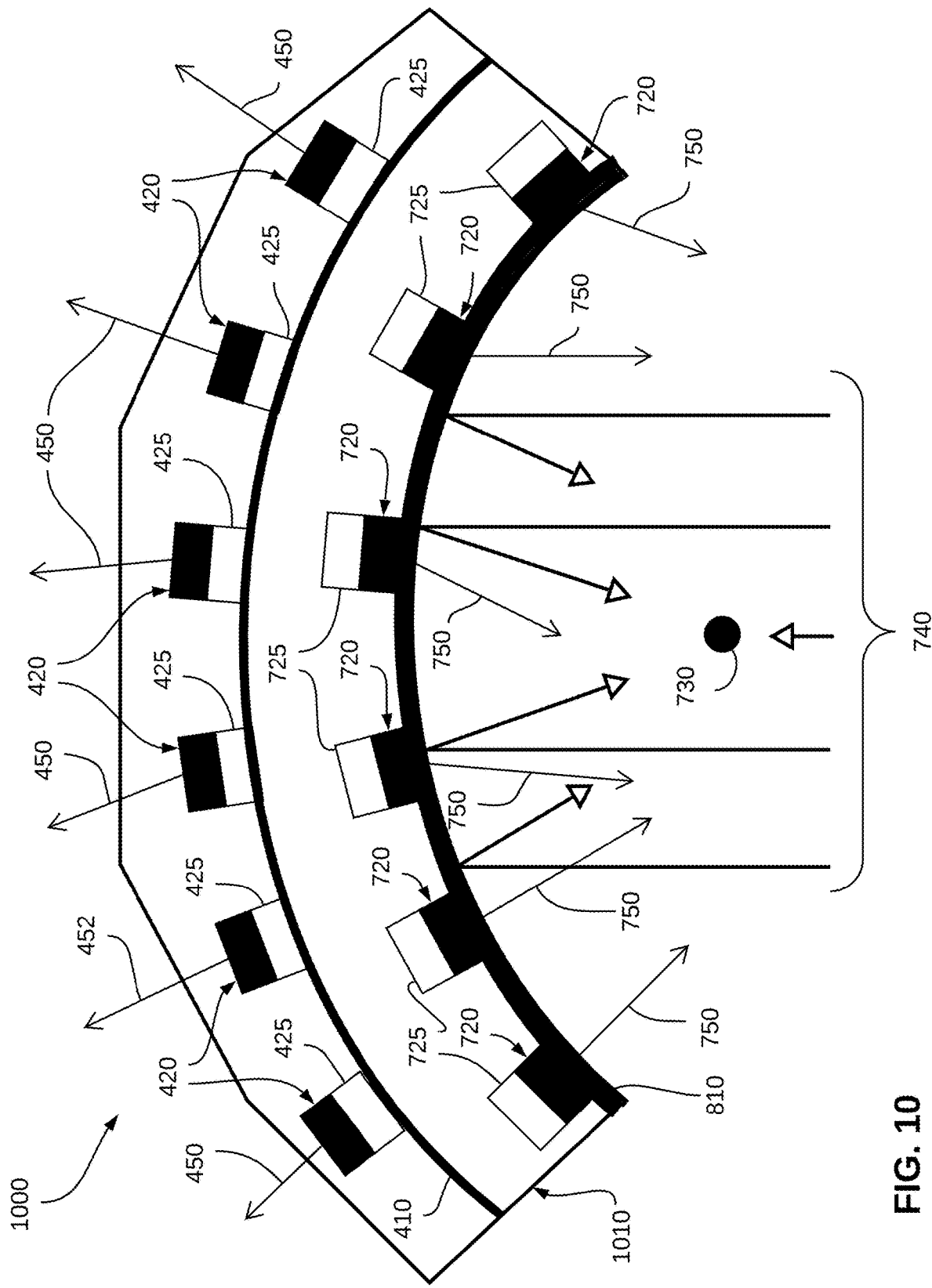
FIGS. 10 and 11 show various combinations of the RF/FSO hybrid transceivers shown in FIGS. 7-9, in accordance with embodiments described herein.
Figure 11:
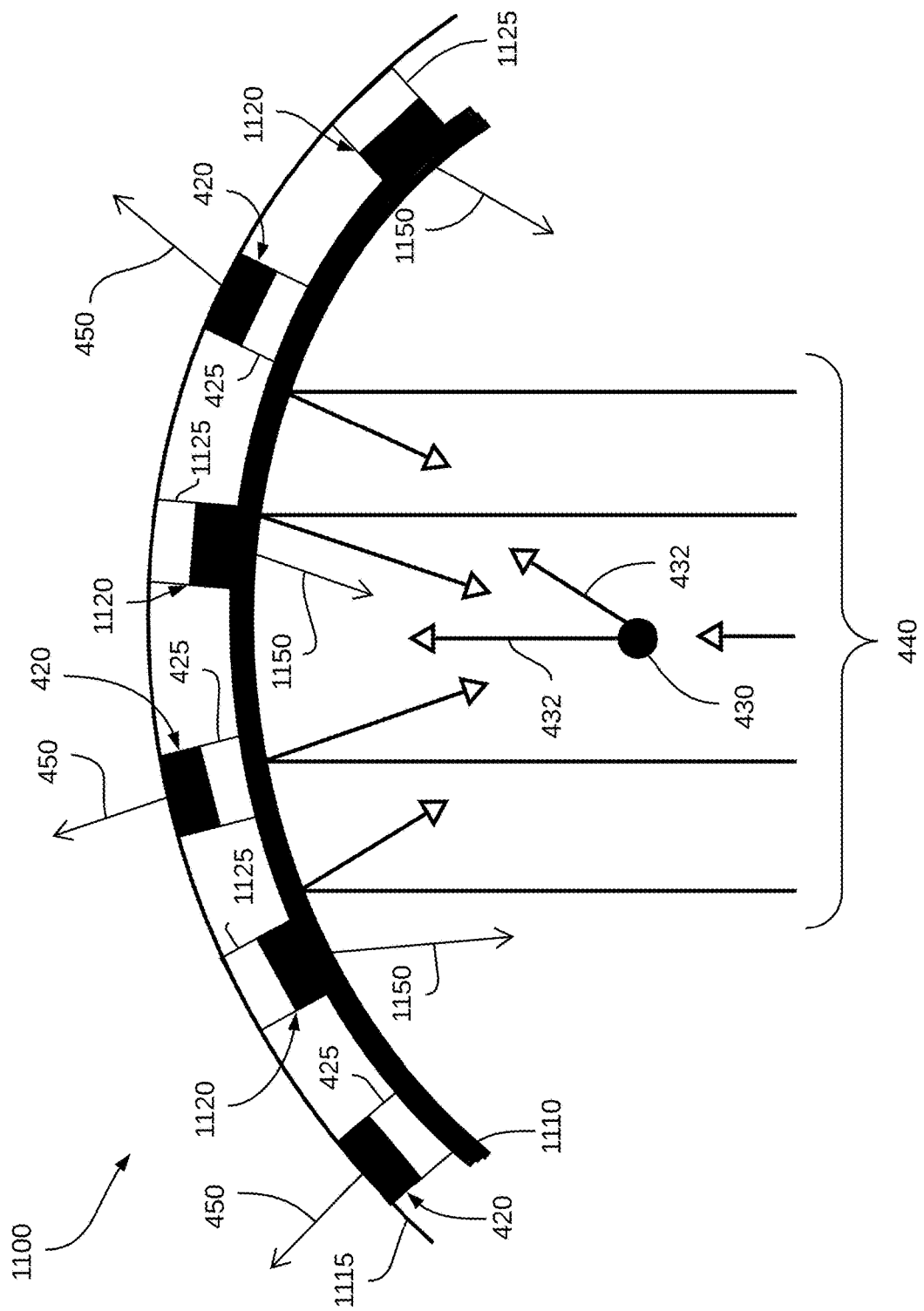

FIGS. 10 and 11 show various combinations of the RF/FSO hybrid transceivers shown in FIGS. 7-9, in accordance with embodiments described herein. FIG. 10 shows an exemplary RF/FSO hybrid transceiver 1000 capable of emitting and receiving optical signals over a wider range of angles compared to previously described embodiments. RF/FSO hybrid transceiver 1000, as shown in FIG. 10, is a combination of the embodiments illustrated in FIGS. 4 and 8 such that arrays of MOCA sub-transceivers pointing outward from RF/FSO hybrid transceiver 1000 (i.e., MOCA sub-transceivers 420) and pointing inward toward RF receiver 730 (i.e., MOCA sub-transceivers 720) are capable of transmitting and receiving optical signals on either side of an enclosed parabolic antenna 1010. Other components for providing control over the various elements in the system, such as combining, splitting, and processing elements, are not shown in FIG. 10 for clarity.

Another variation is shown in FIG. 11. A RF/FSO hybrid transceiver 1100 of FIG. 11 includes a radio reflector 1110, which, like front surface 810 of parabolic antenna 710 of FIG. 8, is transmissive to wavelengths in the optical communication wavelengths (e.g., infrared) while reflecting signals in the radio frequencies. Some of the sub-transceivers in RF/FSO hybrid transceiver 1100 are essentially similar to MOCA sub-transceivers 420 of FIG. 4, and are mounted to enable optical signal transmission and reception outwardly away from the RF-reflective front surface 1110 through an enclosure 1115. Other MOCA sub-transceivers 1120 include control circuitry 1125 and are mounted to transmit and receive optical signals (as represented by arrows 1150) through radio reflector 1110. In this way, RF/FSO hybrid transceiver 1100 is capable of the wide-angle optical signal transmission/reception in a thinner device profile than RF/FSO hybrid transceiver 1000 of FIG. 10. Again, system control components are not shown in FIG. 11 for clarity.

The embodiments described above enable the seamless integration of a RF communication link with multiple optical communication links by taking advantage of the capabilities of the MOCA sub-transceiver array. In this way, by adding an optical mode to a multimode RF terminal allows the full spectrum of wavelengths, from RF to optical, to be covered in a single communication terminal. For instance, the optical communication capabilities of the MOCA sub-transceiver array enables high speed, secure communications, while the RF capabilities allow the use of robust, well-established communication protocols. The optical and RF channels can, for instance, provide redundancy such that, when one channel fails, the other one can pick up the slack. In other implementations, the optical and RF channels can provide complementary communication modes. For instance, in an application, while the optical channels transmit encrypted data, the encryption key may be transmitted on the RF channel such that the data can only be deciphered if the receiver also has both RF and optical communication capabilities. The simultaneous implementation of RF and optical data transmission and receiving capabilities enable a wide range of previously impossible applications, such as air-to-ground, air-to-air, and ground-to-ground (including moving transport and nautical applications) scenarios.

There are three logical modes of communication using the RF/FSO hybrid system as described herein: 1) RF only; 2) optical only; and 3) hybrid RF+optical. The RF only mode is most convenient for relatively easy acquisition and low precision beam pointing. Using the RF only mode also allows broader distribution of the network topology, including location, altitude, attitude, node status (e.g., off-line, trying to acquire, busy communicating with other nodes, local propagation conditions, etc.) potentially among all nodes simultaneously. The optical only mode is least likely to be detected or intercepted, and provides a much greater bandwidth over RF only. The hybrid RF+Optical mode combines the advantages of both RF and optical communication modes.

Depending on propagation conditions, one or the other of the RF and optical channels will be more reliable and able to stay in communication with the other nodes. In addition, by evaluating which is the most effective communication channel at any given time, the network can decide how to prioritize the information and send the prioritized data through via the appropriate channel. As an example, if clouds or dust begins to adversely affect the optical channel, the network can revert to the RF link and send the critical data only while still attempting to send higher bandwidth data via the optical link. In addition, the RF link can provide a reliable checksum or quality of service report back to the transmitting node regarding the optical channel even if the optical channel is fading in and out due to, for example, environmental conditions. Using such a report can be useful for modifying, for example, the optical transmission modulation scheme, data rate or other parameters accordingly so as to increase the effectiveness of the link. For example, on-off keying (OOK), binary phase shift keying (BPSK), differential phase shift keying (DPSK), and quadrature amplitude modulation (QAM) are a few of the possible modulation schemes that can be readily implemented at the RF/FSO hybrid transceiver.

Figure 12:
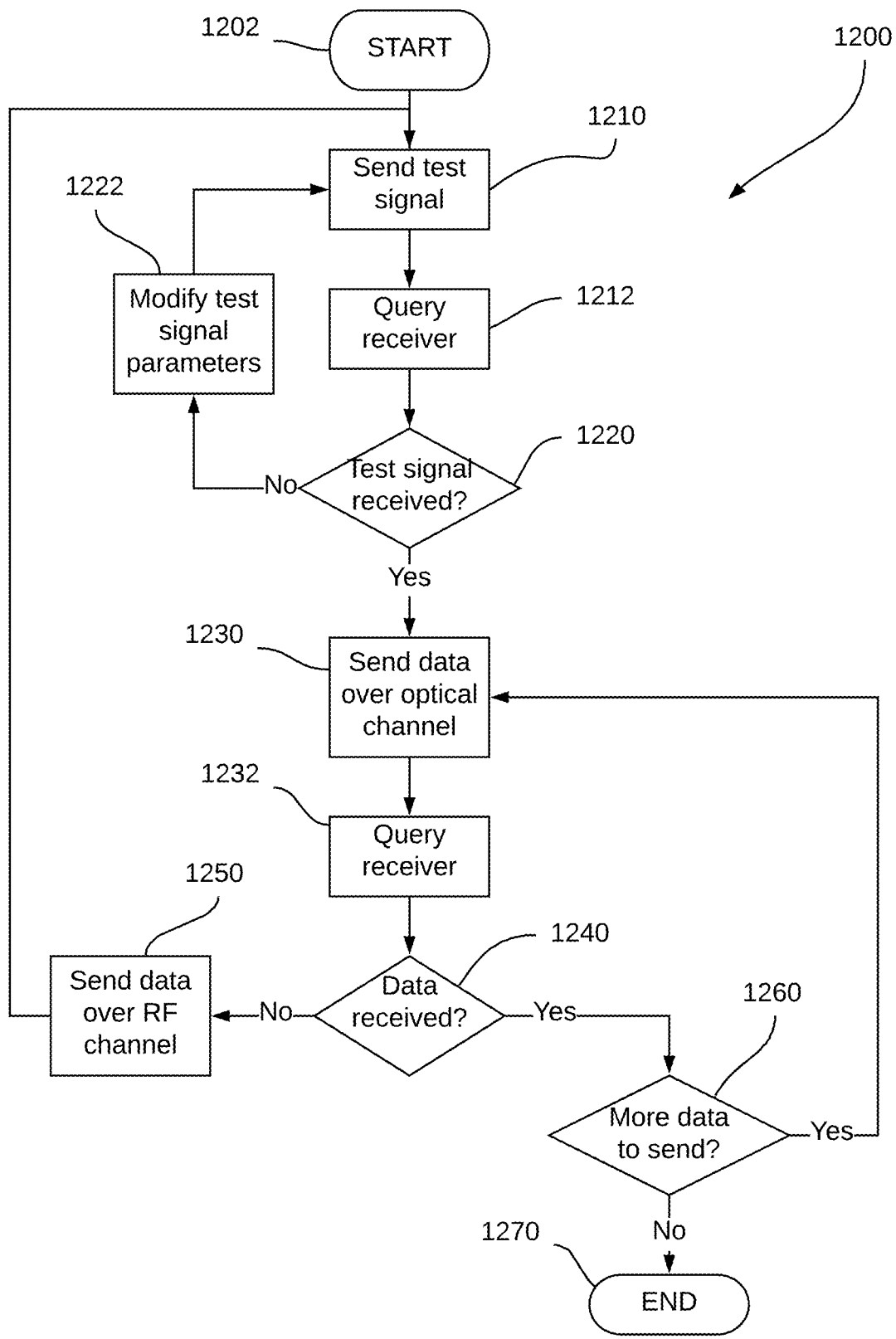
FIG. 12 shows a feedback process for improving communication efficiency using RF/FSO hybrid transceivers, in accordance with an embodiment.

An example of a communication status feedback process for RF/FSO hybrid transceivers is illustrated in FIG. 12. As shown in FIG. 12, a process 1200 is initiated at an RF/FSO hybrid transceiver (such as one of the embodiments described above) in a start step 1202, then a test signal is sent from the RF/FSO hybrid transceiver toward a receiver arrangement located remotely from the RF/FSO hybrid transceiver in a step 1210. The test signal can be an RF signal, an optical signal, or both, depending on the capabilities of the receiver arrangement. For example, if the receiver arrangement is a traditional RF receiver, then the test signal is an RF signal. If the receiver arrangement includes optical signal reception capabilities, then the test signal can be an optical signal. If the receiver arrangement is another RF/FSO hybrid transceiver, then either or both RF and optical test signals can be used in step 1210. If no a priori knowledge of the receiver (i.e., whether the receiver is capable of RF communications only, optical communications only, or RF/FSO hybrid communication enabled) is available, then step 1210 may further include additional steps to first determine the capabilities of the receiver in addition to establishing a handshake between the RF/FSO hybrid transceiver and the receiver arrangement.

Then the receiver arrangement is queried in a step 1212 to determine whether the test signal from step 1210 had been received at the receiver arrangement. The query can be, for example, a part of the test signal to request a confirmation receipt from the receiver arrangement, or alternatively a separate query signal can be sent to the receiver arrangement. In a decision 1220, a determination is made whether the test signal was received at the receiver arrangement. If the answer to decision 1220 is NO, the test signal was not received at the receiver arrangement (e.g., no confirmation receipt was received from the receiver arrangement, or the receiver arrangement responds to the separate query signal that no test signal had been received), then process 1200 proceeds to a step 1222 to modify one or more parameters of the test signal (e.g., direction, phase, wavelength, timing, etc.), then returns to step 1210 to resend the test signal with the modified parameters.

If the answer to decision 1220 is YES, the test signal was received (e.g., a confirmation receipt was received at the RF/FSO hybrid transceiver) and assuming the receiver is capable of accepting optical data, then process 1200 proceeds to a step 1230 to send data over the optical channel of the RF/FSO hybrid transceiver to the receiver arrangement. In a step 1232, a query is sent to the receiver arrangement whether the data has been received over the optical channel. In a decision 1240, a determination is made whether the data is being received at the receiver arrangement. The query and determination can be, for instance, a confirmation request sent to the receiver arrangement. If the answer to decision 1240 is NO, data is not being received at the receiver arrangement via the optical channel, then process 1200 proceeds to a step 1250 to attempt to send data over the RF channel instead. Then, in order to attempt to revert to the optical channel communication instead, process 1200 returns to step 1210 to establish communications with the receiver arrangement using test signals.

If the answer to decision 1240 is YES, the optical data is being received at the receiver arrangement, then a determination is made in a decision 1260 whether there is additional data to be sent to the receiver. If the answer to decision 1260 is YES, there is more data to be sent, then process 1200 returns to step 1230 to send more data over the optical channel. If the answer to decision 1260 is NO, all necessary data has been transmitted, then process 1200 ends in an end step 1270.

While process 1200 shows data being sent first by the optical channel, then by RF channel in case of optical channel failure, the process can be reversed such that the data can be first sent by RF then, once the RF channel has been established, sending the remaining data over the optical channel. That is, although optical communication channels can provide high speed transmission rates and added security, RF communications also have advantages in certain environmental conditions as RF channels can be more robust and readily established. Having both RF and optical capabilities at the RF/FSO hybrid transceiver allows flexibly adjusting to the transmission conditions ad hoc. Additionally, depending on the communication performance and connectivity status at any given time, the RF/FSO hybrid transceiver system can be configured to enable automatic transfer between optimal modes. For example, the RF/FSO hybrid transceiver system can choose in an ad hoc manner between different RF frequencies, optical wavelengths, and even between RF and optical modes, depending on the transmission performance between the RF/FSO hybrid transceiver system and the intended receiver. As another example, the RF/FSO hybrid transceiver system can use an RF channel as a tracking channel to ensure optimal connection with the receiver, as well as monitoring the various channels to determine the best transmission mode on the fly. Furthermore, even while data is being transmitted optically, the RF channel can be monitored such that, if the optical link begins to degrade, the RF channel is queued for a quick handoff to RF data transmission.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

For example, the RF/FSO hybrid transceiver may be configured for emitting and receiving optical and RF signals, respectively, in at least one of a space, airborne, terrestrial, and marine environment. Additionally, the RF/FSO hybrid transceiver may further include a mounting mechanism for coupling the RF/FSO hybrid transceiver with at least one of a ground vehicle, an aircraft, a marine vessel, a satellite, and a ground station.

As further examples, the RF/FSO hybrid transceiver may be further configured such that the RF signals functions as one of a back channel, a telemetry data link, and a source of complementary information, while the FSO sub-transceivers facilitates high speed data transfer. Alternatively, the RF and optical channels may be configured to provide redundancy for each other.

Furthermore, the RF/FSO hybrid transceiver may create multiple simultaneous optical links. If multiple RF/FSO hybrid transceivers are available, the multiple simultaneous optical links may create, for instance, mesh networks and other network configurations.

Accordingly, many different embodiments stem from the above description and the drawings. It will be understood that it would be unduly repetitious and obfuscating to literally describe and illustrate every combination and sub-combination of these embodiments. As such, the present specification, including the drawings, shall be construed to constitute a complete written description of all combinations and subcombinations of the embodiments described herein, and of the manner and process of making and using them, and shall support claims to any such combination or sub-combination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A radio frequency (RF)/free space optical (FSO) hybrid transceiver comprising:
   at least one FSO sub-transceiver configured for emitting and receiving optical communication signals;
   at least one RF sub-transceiver configured for emitting and receiving RF communication signals; a processor configured for controlling the at least one RF sub-transceiver and the at least one FSO sub-transceiver, and for processing both the RF communication signals and optical communication signals;
   a splitter/combiner;
   a plurality of delay systems; and
   a plurality of mirrors,
   wherein the splitter/combiner, the plurality of delay systems, and the plurality of mirrors are configured to cooperate with the processor produce a plurality of rays, and wherein the at least one RF sub-transceiver and the at least one FSO sub-transceiver cooperate to simultaneously emit and receive optical and RF communication signals at the RF/FSO hybrid transceiver.

2. The RF/FSO hybrid transceiver of claim 1, wherein the processor is further configured for simultaneously processing optical communication signals and RF communication signals from at least one of an externally located RF sub-transceiver, an externally located FSO sub-transceiver, and an externally located RF/FSO hybrid transceiver.

3. The RF/FSO hybrid transceiver of claim 1,
wherein the at least one FSO sub-transceiver includes a Managed Optical Communications Array (MOCA) sub-transceiver.

4. The RF/FSO hybrid transceiver of claim 3,
wherein the at least one FSO sub-transceiver is configured for emitting and receiving optical communication signals over a range of angles, wavelengths, and polarization states.

5. The RF/FSO hybrid transceiver of claim 1,
wherein the at least one RF sub-transceiver includes a plurality of RF antennae, each one of the plurality of RF antennae being configured to cover a spectrum range different from each other one of the plurality of RF antennae.

6. The RF/FSO hybrid transceiver of claim 5, wherein the at least one FSO sub-transceiver emits optical signals in at least the same direction as the RF antennae.

7. The RF/FSO hybrid transceiver of claim 1, further comprising:
a coating covering a surface of the at least one FSO sub-transceiver,
wherein the coating is formed of a material that is reflective to RF and is further transmissive over optical communication wavelengths.

8. The RF/FSO hybrid transceiver of claim 1, further comprising:
a radio reflector formed of an RF reflective, IR transmissive material such that the at least one FSO sub-transceiver may emit and receive optical signals through said radio reflector.

9. The RF/FSO hybrid transceiver of claim 1, wherein the at least one FSO sub-transceiver and at least one RF sub-transceiver are configured for enabling automatic transfer between RF and optical communication modes.

10. A radio frequency (RF)/free space optical (FSO) hybrid transceiver comprising:
at least one FSO sub-transceiver configured for emitting and receiving optical communication signals;
at least one RF sub-transceiver configured for emitting and receiving RF communication signals; and
a coating covering a surface of the at least one FSO sub-transceiver,
wherein the coating is formed of a material that is reflective to RF and is further transmissive over optical communication wavelengths, and
wherein the at least one RF sub-transceiver and the at least one FSO sub-transceiver cooperate to simultaneously emit and receive optical and RF communication signals at the RF/FSO hybrid transceiver.

11. The RF/FSO hybrid transceiver of claim 10, further comprising:
a processor configured for controlling the at least one RF sub-transceiver and the at least one FSO sub-transceiver, and for processing both the RF communication signals and optical communication signals.

12. The RF/FSO hybrid transceiver of claim 11, further comprising:
a splitter/combiner;
a plurality of delay systems; and
a plurality of mirrors,
wherein the splitter/combiner, the plurality of delay systems, and the plurality of mirrors are configured to cooperate with the processor produce a plurality of rays.

13. The RF/FSO hybrid transceiver of claim 11, wherein the processor is further configured for simultaneously processing optical communication signals and RF communication signals from at least one of an externally located RF sub-transceiver, an externally located FSO sub-transceiver, and an externally located RF/FSO hybrid transceiver.

14. The RF/FSO hybrid transceiver of claim 10,
wherein the at least one FSO sub-transceiver includes a Managed Optical Communications Array (MOCA) sub-transceiver.

15. The RF/FSO hybrid transceiver of claim 14,
wherein the at least one FSO sub-transceiver is configured for emitting and receiving optical communication signals over a range of angles, wavelengths, and polarization states.

16. The RF/FSO hybrid transceiver of claim 10,
wherein the at least one RF sub-transceiver includes a plurality of RF antennae, each one of the plurality of RF antennae being configured to cover a spectrum range different from each other one of the plurality of RF antennae.

17. The RF/FSO hybrid transceiver of claim 16, wherein the at least one FSO sub-transceiver emits optical signals in at least the same direction as one of the plurality of RF antennae.

18. The RF/FSO hybrid transceiver of claim 10, further comprising:
a radio reflector formed of an RF reflective, IR transmissive material such that the at least one FSO sub-transceiver may emit and receive optical signals through said radio reflector.

19. The RF/FSO hybrid transceiver of claim 10, wherein the at least one FSO sub-transceiver and at least one RF sub-transceiver are configured for enabling automatic transfer between RF and optical communication modes.

* * * * *